Figure 1:
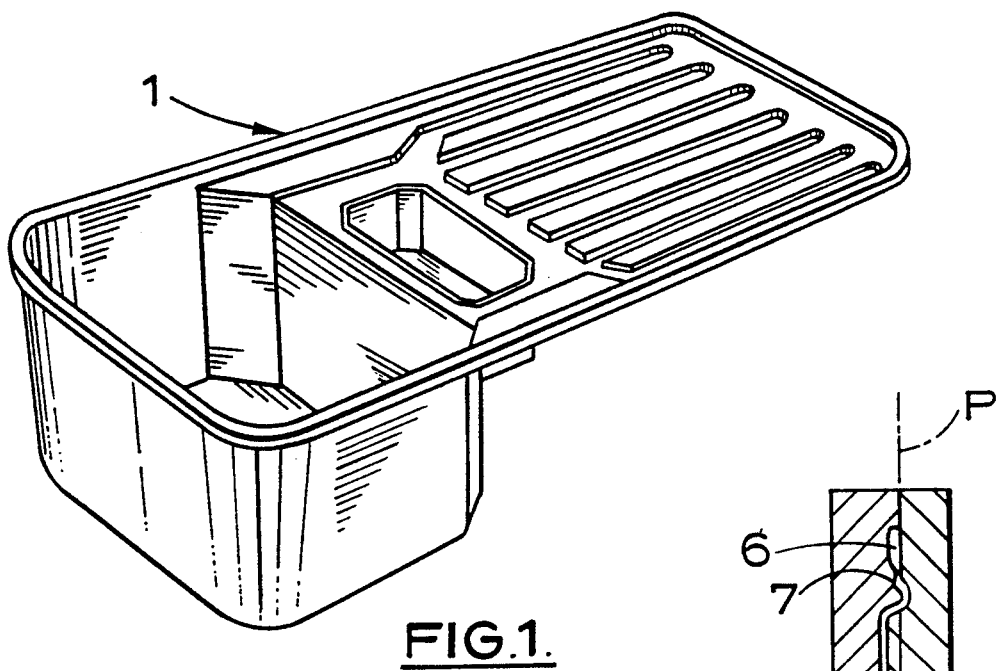

United States Patent [19]

Cooper et al.

[11] Patent Number: 5,064,585

[45] Date of Patent: Nov. 12, 1991

[54] PROCESS OF MANUFACTURING A THIN-WALLED PLASTICS MOULDING

[75] Inventors: Royston B. Cooper, Tipton; Jonathan G. Leak, Solihull, both of England

[73] Assignee: Glynwed Consumer & Building Products Limited, Birmingham, England

[21] Appl. No.: 609,112

[22] Filed: Oct. 31, 1990

Related U.S. Application Data

[63] Continuation of Ser. No. 323,762, Mar. 15, 1989, abandoned.

[30] Foreign Application Priority Data

Mar. 17, 1988 [GB] United Kingdom ............... 8806299

[51] Int. Cl.⁵ ............................................. B29C 45/73
[52] U.S. Cl. ............................. 264/40.6; 264/102; 264/235; 264/327; 264/328.18
[58] Field of Search ............... 264/102, 40.6, 327, 264/328.16, , 328.18, 235

[56] References Cited

U.S. PATENT DOCUMENTS

| | | | |
|---|---|---|---|
| H559 | 12/1988 | Brown | 425/812 |
| 4,247,519 | 1/1981 | Sano | 425/303 |
| 4,338,068 | 7/1982 | Suh et al. | 264/327 |
| 4,340,562 | 7/1982 | Gross et al. | 264/328.16 |
| 4,511,319 | 4/1985 | Takayama | 264/40.1 |
| 4,562,990 | 1/1986 | Rose | 264/102 |
| 4,636,084 | 1/1987 | Kopernicky | 264/102 |
| 4,707,310 | 11/1987 | DeBeaud | 264/40.6 |
| 4,784,814 | 11/1988 | Diethelm et al. | 264/327 |
| 4,792,576 | 12/1988 | Nodelman | 264/328.6 |
| 4,816,197 | 3/1989 | Nunn | 264/40.6 |

Primary Examiner—Robert A. Dawson
Assistant Examiner—Allan R. Kuhns
Attorney, Agent, or Firm—Spensley Horn Jubas & Lubitz

[57] ABSTRACT

Rigid mouldings, e.g. kitchen sinks, having a wall thickness generally not exceeding approximately 0.4in (10 mm) are produced by a process in which pre-heated and de-gassed curable resin composition, which sets within 60 minutes, is supplied under at least 4 psi (280 g/cm²) pressure to fill a hotter mould and thereafter until the composition in the mould has set so as to compensate for shrinkage. The composition temperature is controlled in the mould to maintain a substantially linear temperature gradient in the composition increasing from its entry into the mould for the composition to set progressively through the mould back to the entry. Preferably the composition includes an epoxide resin, an anhydride hardener and a mineral filler, and the temperature gradient is approximately 10° C. Typically using a solid system composition maximum pre-heated mould temperature is 170° C., the composition is supplied at 90°–120° C. at 15 psi (1050 g/cm²) and the moulding is removed in under 30 minutes for heat treatment. Using a liquid system composition maximum pre-heated mould temperature is typically 120°–160° C. and composition is supplied at about 50° C.

10 Claims, 1 Drawing Sheet

PROCESS OF MANUFACTURING A THIN-WALLED PLASTICS MOULDING

This is a continuation of application Ser. No. 07/323,762 filed on Mar. 15, 1989, now abandoned.

This invention relates to a process of manufacturing a thin-walled plastics moulding.

In particular, though not exclusively, the present invention is concerned with the moulding of articles such as kitchen sinks, shower bases and the like which are relatively large and are required to be rigid without being unduly heavy. To keep down the weight, and in so doing also reduce the amount and cost of the plastics material used in the manufacture, it is desirable for the mouldings to be thin-walled, that is in general of a thickness not exceeding approximately 0.4 in (10 mm).

Manufacture from plastics materials has the advantage that the articles can be offered in a variety of colours to suit customers' requirements. It is desirable, however, that, as well as being rigid and heat resistant, the materials should present a good surface finish, be hard wearing and abrasive resistant, have reasonable impact strength, a long useful life without deterioration and, particularly in the case of domestic sinks, be resistant to attack from detergents and other household chemicals. Acrylic resins such as ASTERITE, registered trade mark, have been used but they have a high shrinkage characteristic, even when heavily filled, which necessitates the use of complex tooling, and also they require a relatively long in-mould time to reach a sufficiently stable state for removal which slows down production rates and is disadvantageous so far as high volume manufacture is concerned. There are epoxide resins which will meet the requirements and also have lower shrinkage and require a shorter in-mould time than the acrylic resins, however hitherto these materials have not been used in the commercial production of articles such as have been mentioned because they are relatively costly and there have been difficulties in obtaining satisfactory mouldings.

It is known to manufacture thick-walled plastics mouldings by casting from a pre-heated liquid resin composition, such as an epoxide resin, including a filler, which passes through a gelled state before curing. A process developed by Ciba-Geigy AG for the production of such mouldings is the subject of their British Patent No. 1 323 343. In that process the resin composition, which is capable of setting within three to sixty minutes, is poured substantially without pressure into a pre-heated mould substantially to fill the mould, and further composition is supplied to the mould under pressure to compensate for shrinkage of the composition until the composition has set. By the term "thick-walled" is meant, according to the patent specification, mouldings which have at least one zone of sufficiently large volume to contain an inscribed sphere of 1.57 in (4 cm) diameter. The process is particularly applicable to electrical insulators.

We set out to apply that process to the making of thin-walled mouldings for articles such as have been mentioned, but found that it had considerable limitations in respect of speed of production and the quality of the surface finish of the mouldings produced. The process of manufacturing in accordance with the present invention has been devised with the object of producing a thin-walled plastics moulding of an acceptable quality and at a rate of production suitable for high volume manufacture.

According to the present invention there is provided a process of manufacturing a thin-walled plastics moulding, in which a pre-heated and de-gassed resin composition capable of setting within sixty minutes is supplied under a pressure of at least 4 psi (280 g/cm$^2$) to a hotter pre-heated mould so as substantially to fill the mould, gases are exhausted from the mould as it is filled and are restrained from entering into the mould during setting of the composition, further composition is supplied under pressure to the mould until the composition has set to compensate for shrinking of the composition, and the temperature of the composition in the mould is controlled such that a substantially linearly increasing temperature gradient is maintained in the composition away from the entry for the composition into the mould and setting of the composition progresses through the mould back to the entry.

Preferably the temperature gradient ranges through approximately 10° C. although the range may be higher, or even lower, for some compositions, depending upon their setting times. It is essential that composition at the higher end of the temperature gradient does not set and over-cure before the composition at the lower end of the gradient sets. It is important therefore not to have the temperature range too high.

The mould is preferably pre-heated so that its lowest temperature is at least 10% higher than the temperature at which the pre-heated composition enters the mould. The higher the operating temperature of the mould and the temperature of the composition in the mould the more quickly the composition sets. In general it is desirable to keep the temperature as low as possible without the composition becoming too viscous to spread evenly through the mould during filling.

Conveniently gases are expelled from the mould during filling at a riser or into a gas collecting chamber or chambers which is, or are, caused to be closed off when the mould is filled with the composition. Gases are thereby prevented from being drawn into the mould by way of the riser or from the chamber or chambers as the composition sets. It is essential for gases to be removed from the composition before it enters the mould. All the further composition supplied to the mould during setting is supplied by way of the entry for the composition in the filling of the mould.

The mould may be horizontally or vertically orientated, that is the major dimension of the mould cavity may be respectively horizontally or vertically disposed. An inclined orientation of the mould may also be possible. Usually the composition will enter at the bottom of the mould. The pressure at which the composition is supplied can be lower when the mould is horizontally orientated then when it is vertically orientated because there is less back pressure from composition already in the mould. With a horizontal orientation 4 psi (280 g/cm$^2$) has been found to be the minimum effective pressure whereas with a vertical orientation the minimum effective pressure is nearer 6 psi (420 g/cm$^2$). For normal production the moulding operation may be carried out safely at a pressure of 20 psi (1400 g/cm$^2$). Experimentally mould filling has been carried out satisfactorily at pressures of 30–40 psi (2100–2800 g/cm$^2$). The mould pressure may be equal to or greater than the fill pressure; it may be up to about 50 psi (3500 g/cm$^2$).

In the manufacture of a combined sink and drainer unit weighing approximately 22 lb (10 kg) from an epoxide resin, filling the mould in a horizontal orientation with the composition at a pressure of 4 psi (280 g/cm$^2$) or in a vertical orientation with the composition at a pressure of 6 psi, has taken about 15 minutes and setting has been complete after a further 5-20 minutes. Under an experimental pressure of 30-40 psi (2100-2800 g/cm$^2$) filling time for such a unit was reduced to 17 seconds. For production in which the composition is supplied to a vertically orientated mould at a pressure of 15 psi (1050 g/cm$^2$) filling time on average is approximately 1½ to 2 minutes. Allowing 13-20 minutes for setting after filling, it will be appreciated that the sink and drainer unit can be removed from the mould after less than 30 minutes, making it possible to produce at least two of the units per hour.

The moulding can be removed from the mould as soon as the composition has set to a form-stable state. Where the composition is capable of gelling or passes through a gelled state before curing, the composition may be sufficiently form-stable in the gelled state to be removable then from the mould, even though the composition may still be in a green state, that is it is still flexible to some extent and full cross linkage of molecules is incomplete. After removal from the mould the moulding is heat treated to complete the curing cycle of the composition and optimise the properties of the composition in the finished moulding.

The composition is preferably an epoxide resin. Enhanced thermal and physical properties can be achieved by high temperature curing, for example in the region of 120° C.-150° C., and for that purpose an epoxide resin employing an anhydride hardener is desirable. A mixed anhydride derived from di-carboxylic acids may be used. A mineral filler, such as silica and/or alumina may be included to reduce cost, control shrinkage and to improve thermal resistance, abrasion resistance and the modulus of rigidity of the moulded composition. When a filler is included it may also be desirable, depending upon the amount of filler used, to add a suspension agent as well to prevent the filler from separating out as the composition sets. Separation of the filler can produce shadows and speckling in the finished moulding which can be unacceptable in certain articles, such as sink and shower units, in which an even colour hue or tone is usually cosmetically desirable. In the manufacture of the sink and drainer unit referred to approximately 70% of the epoxide resin composition is a filler. For a white unit an alumina filler is generally used and for a coloured unit a silica filler is generally used but these may be varied. Pigmentation additives may, of course, be included in the composition.

An epoxide resin may be used which is available as a solid system (i.e. it is solid at room temperature) comprising ready mixed components of the composition and containing any filler required. The resin is heated into a liquid state and has hardener added to it as it is required to be used. Using resin in this form, typically the temperature at which the composition enters the mould is in the region of 90°-120° C. and the mould is pre-heated to a maximum temperature of approximately 170° C. As an alternative, a liquid resin system (i.e. liquid at room temperature) may be used in which components of the composition are supplied separately in a liquid state and are kept separate until they are required for use. They are supplied to a mixer head where they are combined to form the complete composition just prior to being introduced into the mould. With the liquid resin system typically the composition is introduced into the mould at a temperature of about 50°-70° C., and the mould is pre-heated to a maximum temperature in the region of 120°-170° C. Using the liquid resin system heat treatment to complete the gelling cycle after removal of the moulding from the mould takes typically approximately 2-10 hours at a temperature of 120°-145° C. as compared with, typically, approximately 2 hours at 130°-135° C. for a moulding produced from the solid resin system. Accelerators may be included in the composition to reduce the heat treatment time.

Defects such as staining of the finished moulding and discolouration, such as yellowing of a white composition, are avoided by careful control of the time taken to fill the mould and the temperature of the composition in the mould during filling and setting. By control of the temperature of the mould and across the thickness of the composition in the mould gelling of the composition can be initiated on a selected face of the mould. In this way a desired quality of surface finish can be selectively achieved at a face of the moulding and additionally by such control separation of a selected face of the moulding from the mould may be facilitated. Thus a front face of the moulding may be arranged to be readily separated from the mould, and ejection may be effected from a back face where any marks caused by the ejection means can usually be tolerated. In the manufacture of the sink and drainer unit referred to the temperature of the mould is controlled to cause the moulding to gel on the male face of the mould which defines the front face of the unit. For this, in a vertically orientated mould, the temperature of the male mould half is typically 8°-12° C. higher than the temperature of the female mould half.

Preferably the mould has a plurality of heating zones the temperatures of which are individually adjustable to provide a desired temperature gradient through the composition in the mould. The number of heating zones may be selected according to the size and shape of the moulding to be produced. There may be more heating zones in one half of the mould than the other. Preferably the heating zones are heated by means of heating elements, such as electrically heated cartridge elements, built into the structure of the mould. Temperature sensors, for example thermo-couples, may be located at the zones to measure temperature and control the heating means. Further temperature indicating means may be provided at the zones whereby temperature readings can be taken at several positions across each zone so that temperatures can be monitored across the zone and adjustments made if necessary.

Fine control of the temperatures of the heating zones is important to ensure that hotter or cooler spots do not occur in the desired temperature gradient of the composition in the moulding, which can adversely affect the distribution of the composition in the mould and the setting phase of the process.

Figure 2:
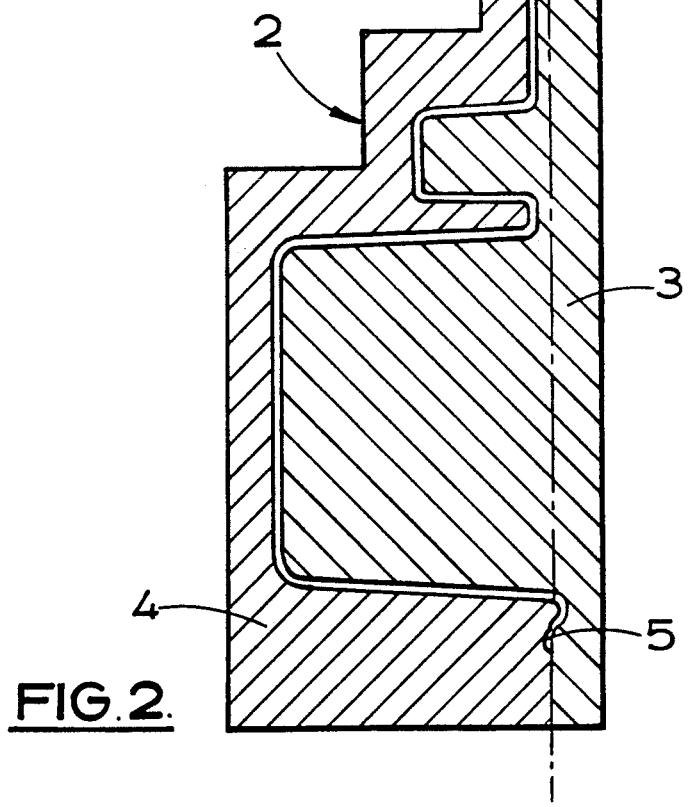

An embodiment of the invention will now be described by way of example only with reference to the accompanying drawings in which:

FIG. 1 is a perspective view of a combined sink and drainer unit made by a process in accordance with the present invention, and FIG. 2 is a diagrammatic section through a mould in which the unit is moulded.

The sink and drainer unit 1, as shown in FIG. 1, is made as a single moulding from an epoxide resin. Typically the unit weighs approximately 22 lb (10 kg) and has a general wall thickness of 0.24 in (6 mm).

The epoxide resin is a bisphenol A/novolac composition available from Ciba-Geigy AG as a solid system under the trade mark VELSTRA, which is a formulation of ARALDITE, registered trade mark, containing (nominally 70% by weight) an alumina and/or silica filler, the filler particles generally having a mean diameter of less than 100μm, and pigmentation according to the finished moulding colour required.

In the process a vertically orientated mould 2 is used comprising a male mould half 3 and a female mould half 4, both of steel, which meet at a vertical parting plane P. As shown in FIG. 2, the mould cavity defines the unit shape on end with the drainer portion of the unit uppermost. There is a runner 5 at the bottom of the female mould half 4 and gas collecting chambers 6 at the top of the female mould half which, when the mould is closed, are closed off by the male mould half, and are connected to the upper end of the mould cavity by restricted venting passages 7 defined at the parting plane P. Fixing components and other fittings required in the unit may be positioned in the mould to be embedded in the moulding, or may be applied subsequently to the moulding.

A silicone release agent is applied to the cavity surfaces of both mould halves prior to a moulding operation. It is important that the surfaces are thoroughly cleaned before the release agent is applied.

Initially the solid epoxide resin composition is heated into a liquid state at a temperature of approximately 145° C. An anhydride hardener derived from a corresponding dicarboxylic acid is then introduced into the composition in a cold flake form. The hardener is stirred into the composition in a vacuum bell to remove gases from the mixture. The mixture is subjected to de-gassing in the vacuum bell for 15 minutes. Introduction of the hardener reduces the temperature of the mixture and at the end of the de-gassing period the temperature is approximately 105° C. From the vacuum bell the degassed mixture passes to a dispensing pressure pot where the mixture is maintained at a temperature of approximately 95° C., and it is pressurised. Under a pressure of 15 psi (1050 g/cm$^2$) the mixture is finally supplied from the dispensing pressure pot to the mould cavity by way of the runner 5, the mould having been pre-heated to provide a temperature gradient increasing evenly through the mould by approximately 10° C. from the runner to the upper end of the mould. The temperature at the upper end is in the region of 170° C.

Filling of the mould takes about 90 seconds and setting of the mixture to a gelled, form-stable state, takes approximately a further 14 minutes. Throughout this further period mixture continues to be supplied under the afore-mentioned pressure to the mould by way of the runner so as to compensate for any shrinkage of the mixture in the mould. The pressure in the mould is increased to 30 psi (2100 g/cm,) as the mixture gels.

As the mixture is fed into the mould any air and other gases in the mould are expelled into the gas collecting chambers 6 by way of the venting passages 7. When mixture enters the venting passages it rapidly gels under the increased heating in the confined spaces of the passages and effectively seals the passages to trap the gases in the collecting chambers and prevent them from re-entering the mould whilst the mixture is setting in the mould.

There are heating zones in the mould at which the temperature is continually monitored and, if necessary, adjusted to maintain the desired temperature gradient through the mixture to ensure that it sets progressively through the mould back to the runner, and that undesirable localised hotter or colder temperature spots are avoided. For this particular moulding twelve heating zones are provided throughout the mould—six zones in each mould half. The heating is by electrically heated cartridge elements, not shown, housed within the structure of the mould halves. The heating zones are so controlled that not only is the desired temperature gradient maintained in the mixture but the formed moulding gels onto the surfaces of the male mould half, which define the front faces of the moulded sink and drainer unit.

When the mixture has gelled to a form-stable state the moulding can be removed from the mould. The moulding is in fact removed whilst it is still in its green state and there has been no contraction which could give rise to internal stresses in the moulding. The moulding separates from the male mould half and is then ejected from the female mould half. Separation is aided by the silicone release agent. The superfluous gelled mixture at the runner and at the venting passages and collecting chambers can be readily detached from the moulding at this stage.

Subsequently the moulding is subjected to heat treatment to complete the gelling cycle and bring the moulding up to it optimum properties. For this treatment the moulding is placed in a supporting jig in an oven for a period of approximately 2 hours at a temperature of 135° C. The heat treatment period may possibly be reduced by adding an accelerator to the resin composition as the hardener is stirred into the composition in the vacuum bell.

The unit thus produced is rigid, is heat resistant up to 200° C., is resistant to chemical attack from commonly used household cleansing agents and detergents and from fruit juices, and to abrasion from cream cleaning agents containing the usual abrasive materials, has good impact resistance when compared with products made from other heavily filled thermo-setting resins, and has good sustainable even colour, tone and front face texture.

In a further embodiment in which a moulding of the form shown in FIG. 1 is produced from the solid system epoxide resin composition including a brown pigmentation, the composition is introduced into the vertically orientated mould at a temperature of 100° C. under a pressure of 21 psi (1470 g/cm$^2$). The linear temperature gradient of the composition in the mould and gelling on the cavity surfaces of the male mould half are achieved by heating of the male mould half to temperatures ranging from 156° C. to 179° C. and heating of the female mould half to temperatures ranging from 148° C. to 168° C. The mould time, that is the time from initiation of the feeding of the composition into the mould to removal of the green state moulding, is 19 minutes.

In another embodiment a white moulding is produced. The solid system epoxide resin composition is introduced into the mould at a temperature of 100° C. under a pressure of 42 psi (2940 g/cm$^2$), the mould time is 16 minutes with the male mould half heated to temperatures ranging from 158° C. to 177° C. and the female mould half heated to temperatures ranging from 147° C.-170° C.

We claim:

1. A process of manufacturing a thin-walled plastics molding having a wall thickness not exceeding approximately 0.4 in. and having a size and shape comparable to a kitchen sink with a drain board, comprising:

providing a mold having two mold halves which meet at a parting plane and having a mold cavity which has the shape of the molding and which extends along the parting plane, the mold further having an entry located in the vicinity of the periphery of the mold cavity;

providing a fluid, de-gassed curable resin composition pre-heated to a temperature of 50°-120° C. and capable of setting to a form-stable state within sixty minutes;

preheating the mold so that the temperature at each point in the cavity is higher than the temperature of the pre-heat resin at the time the resin is introduced into the cavity and the temperature in the cavity increases linearly from the entry to peripheral regions of the cavity most remote from the entry;

supplying the pre-heated resin to the mold cavity via the entry at a pressure of at least 4 psi so as to substantially fill the mold cavity while gasses are exhausted from the mold as it is filled and are restrained from entering into the mold cavity during setting of the composition in the mold cavity, and supplying additional pre-heated resin to the mold cavity via the entry under pressure until the composition in the cavity is in a form stable state to compensate for shrinkage of the composition in the mold cavity;

removing the resulting molding from said mold cavity when the composition is in a form-stable state; and performing a subsequent heat treatment on the molding to cure the composition;

wherein the maximum temperature of the mold cavity is 120°-170° C. and is approximately 10° C. higher than the temperature of the mold cavity at the entry, whereby setting of the composition progresses along the mold cavity from locations remote from the entry back to the entry.

2. A process according to claim 1 wherein said step of pre-heating is carried out for causing the temperature at the mold entry to be at least 10% higher, with respect to the Centigrade scale than the temperature at which the pre-heated composition enters the mold cavity.

3. A process according to claim 1 in which said mould is vertically orientated, said entry is at a bottom end of said mould and said composition enters said mould at a pressure of at least 6 psi (420 g/cm$^2$).

4. A process according to claim 1 in which said mould is vertically orientated and comprises a female mould half and a male mould half which are relatively movable horizontally to open and close said mould, said female mould half has a bottom end at which is said entry and a top end at which are gas collecting chambers, said composition enters said mould at a pressure at least 6 psi (420 g/cm$^2$), said mould is temperature controlled to cause said composition to set so as to separate from said male mould half when said mould is opened, and said moulding is ejected from said female mould half.

5. A process according to claim 4 in which the temperature of said male mould 2) filling half is 8°-12° C. higher than the temperature of said female mould half.

6. A process according to claim 1 in which said mould has a plurality of heating zones which heat said mould to said temperatures which are adjustable to control said temperature gradient through said composition in said mould.

7. A process according to claim 6 in which said heating zones are heated by heating means in the structure of said mould, and temperature sensors are provided at said heating zones which measure said temperature of said heating zones and control said heating means.

8. A process according to claim 6 in which temperature indicating means is provided at said heating zones whereby temperature readings are taken at several positions across each said heating zone to monitor, and if necessary adjust, said temperature across said heating zone.

9. A process according to claim 1 in which said resin composition is a solid system epoxide resin and includes a mineral filler, said mould is pre-heated to a maximum temperature of 180° C. and in said pre-heating of said resin composition said composition is initially heated to a liquid state at a temperature of approximately 145° C., an anhydride hardener is then added and mixed with said resin composition and said mixture is de-gassed, and said de-gassed mixture is introduced into said mould at a temperature of 90°-120° C. under a pressure of 15-42 psi (1050-2940 g/cm$^2$).

10. A process according to claim 1 in which said resin composition is a liquid system epoxide resin and includes a mineral filler, a hardener is added to said resin composition as said composition is about to be introduced at said mould, said mould is pre-heated to a maximum temperature in the region of 120°-170° C., and said resin composition with said added hardener is introduced into said mould at a temperature of 50°-70° C.

* * * * *